United States Patent [19]
Gross et al.

[11] 3,777,488
[45] Dec. 11, 1973

[54] METHOD AND APPARATUS FOR REACTION PROPULSION

[75] Inventors: Robert A. Gross, New Rochelle, N.Y.; Skillman C. Hunter, Phoenix; Leslie W. Norman, Scottsdale, both of Ariz.

[73] Assignee: The Garrett Corporation, Los Angeles, Calif.

[22] Filed: June 23, 1961

[21] Appl. No.: 119,154

[52] U.S. Cl. .................................. 60/204, 60/270
[51] Int. Cl. ............................................. F02k 7/10
[58] Field of Search ...................... 60/35.6, 35.6 RJ, 60/35.6 N

[56] References Cited
UNITED STATES PATENTS

| | | | |
|---|---|---|---|
| 2,971,329 | 2/1961 | Barsy | 60/35.6 |
| 2,971,330 | 2/1961 | Clark | 60/35.6 |
| 2,861,420 | 11/1958 | Lewis | 60/35.6 |
| 2,966,028 | 12/1960 | Johnson et al. | 60/35.6 |
| 2,990,142 | 6/1961 | Ferri | 60/35.6 |
| 3,011,307 | 12/1961 | Edelfelt | 60/35.6 |
| 3,040,516 | 6/1962 | Brees | 60/35.6 |
| 3,151,446 | 10/1964 | Parilla | 60/35.6 N |
| 2,540,594 | 2/1951 | Price | 60/240 |

OTHER PUBLICATIONS

"Recent Advances in Ramjet Combustion" A.R.S Journal, November 1959, Vol. 29, No. 11, P.P. 819-827.

*Primary Examiner*—Robert F. Stahl
*Attorney*—John H. G. Wallace and Herschel C. Omohundro

EXEMPLARY CLAIM

9. A method of operating an aerothermodynamic duct which comprises the steps of: moving the duct through the air at a Mach number high enough to create a normal shock wave at the inlet end of the duct; bleeding air from the duct at a point spaced longitudinally from the inlet to cause the shock wave to enter the duct; interrupting the air bleeding step to cause the shock wave to move downstream of the duct beyond the point where the air was bled therefrom to a predetermined location; supplying fuel to the duct for mixture with the air and subsequent detonation upon passage through said normal shock wave; and expanding the heated products of the detonation in the downstream end of said duct to impart forward movement to the duct.

11 Claims, 9 Drawing Figures

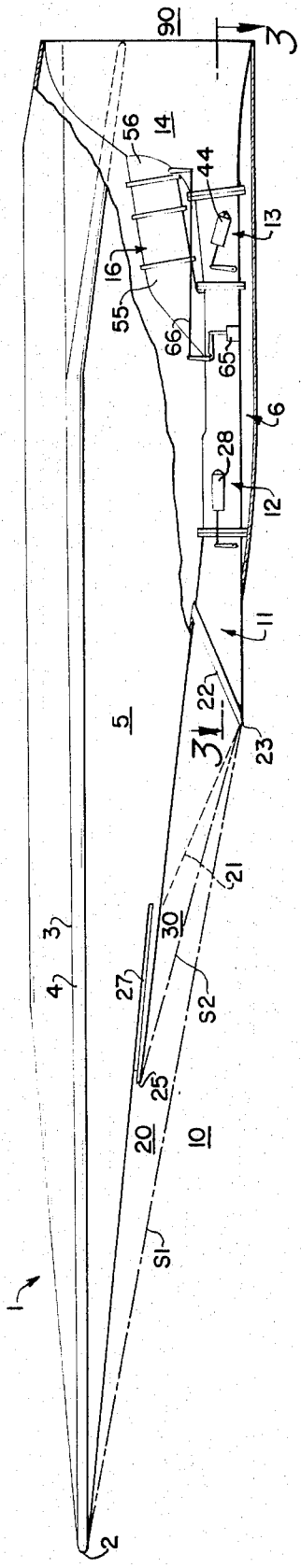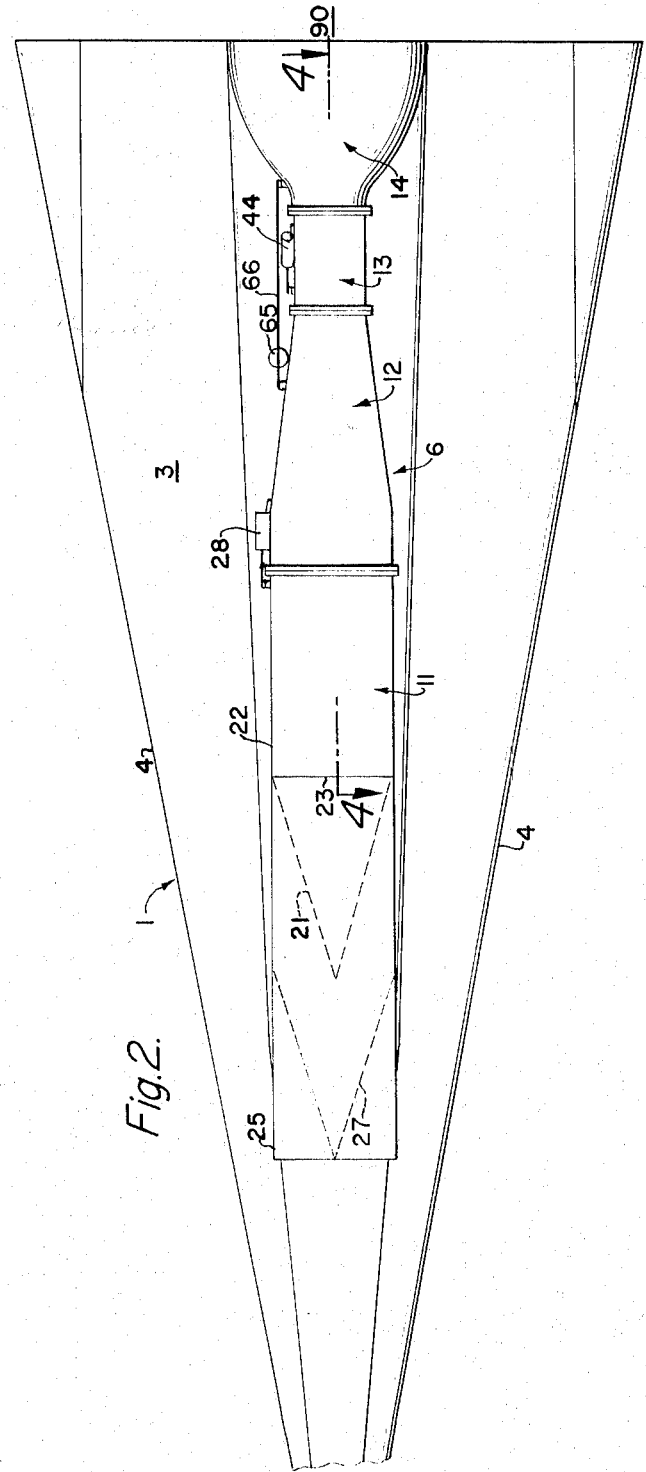

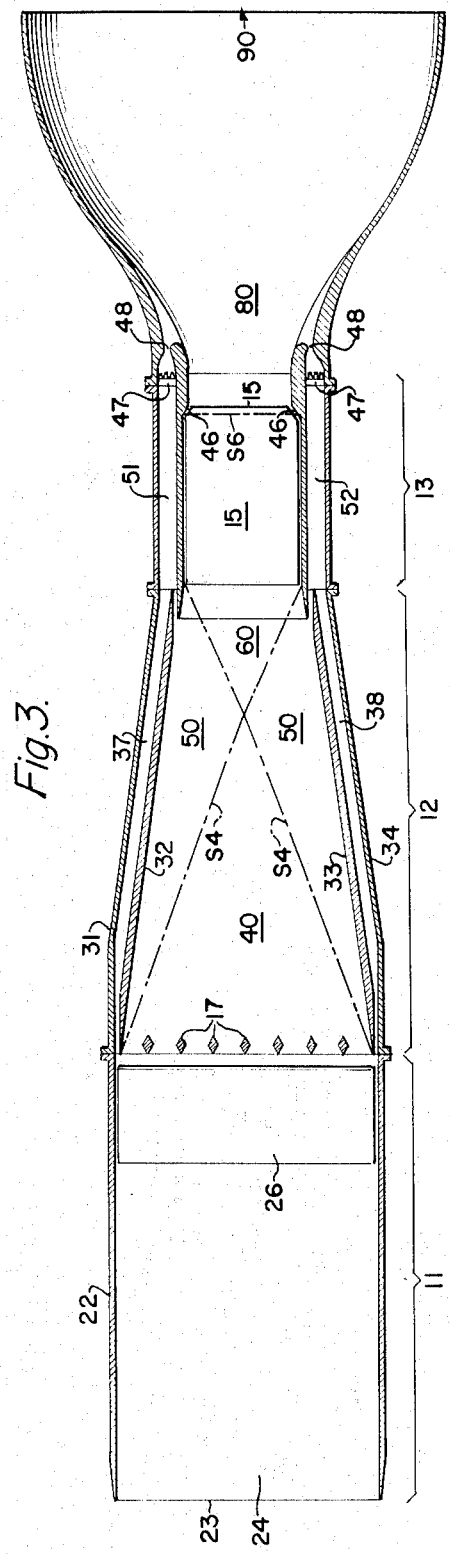

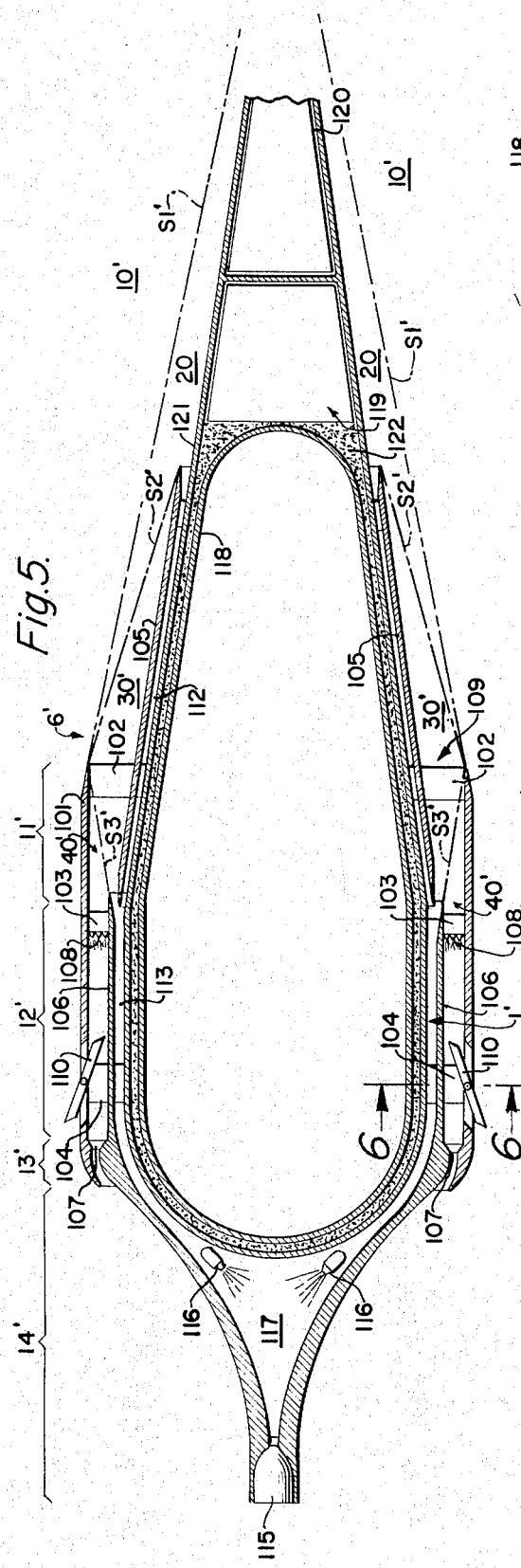

PATENTED DEC 11 1973 3,777,488

INVENTORS:
ROBERT A. GROSS,
SKILLMAN C. HUNTER,
LESLIE W. NORMAN,

BY William E. Martin
Agent.

METHOD AND APPARATUS FOR REACTION PROPULSION

The present invention relates to a reaction propulsion method and apparatus for operation under conditions of relative air flow exceeding the local propagational speed of sound and, more particularly, to a propulsive aerothermodynamic duct wherein combustion of a fuel-air mixture is established and maintained by aerodynamic means. Among the several aims of the invention which will be made further apparent hereinafter is the provision of a novel method and means for exciting sustained combustion in an aerothermodynamic duct into which air is induced at super- or hypersonic velocity, the pressures and temperatures to which the interior of the duct is exposed being mitigated by confinement of said combustion to a relatively short longitudinal zone thereof.

In propulsive aerothermodynamic ducts of the type heretofore known and commonly referred to as ramjets, supersonically induced air is retarded to subsonic velocity, generally through a shock wave, in a diffuser of appropriate internal contour. (In the interest of brevity, speeds relative to the local propagational speed of sound will hereinafter be identified according to the conventional notation of the art in terms of Mach number, $M = V/C$, wherein $V$ is the relative flow velocity under consideration and $C$ is the local propagational speed of sound at the prevailing static temperature.) The subsonic air flow is then further retarded to a speed compatible with the establishment and maintenance of a stable combustion process, for example, to a velocity in the region of $M = 0.2$ to $M = 0.5$, and fuel admixed therewith is ignited by suitable means such as an electric spark device, the resulting combustion, which is self-propagating, being maintained in relatively fixed position with respect to the duct by means of a flameholder generally taking the form of a grid or similar structure mounted transversely of the duct axis. The gaseous combustion product is then expanded through a convergent-divergent nozzle for development of a net pressure difference axially of the duct, thereby to impart a corresponding forward thrust thereto.

Through aerothermodynamic ducts of the prior art have comformed broadly to the described cycle, the construction of a propulsive duct for efficient operation in accordance therewith is beset by numerous problems which it is an object of the present invention to mitigate. For example, in an aerothermodynamic duct intended for operation according to the described cycle, the induced air must be retarded from an initial relative velocity which may be super- or hypersonic to a much lower subsonic velocity thereby to permit the establishment of a stable combustion process and to prevent the resulting flame from being carried downstream of the flameholder and thence out of the exhaust nozzle. Such retardation of the induced air flow, however, is accompanied not only by an increase in pressure but also by a substantial rise in static temperature, both of which effects impose significant stress on the structure defining the intake portion of the duct. If, on the other hand, the induced air is retarded to a lesser degree, the greater flow velocity at the point of ignition imposes the requirement that a longer combustion chamber be provided to accommodate the consequently increased length of flame, the thermal load sustained by the structure downstream of the ignition point being, of course, correspondingly increased. In the present invention, these as well as other problems commonly associated with aerothermodynamic ducts of known type are substantially alleviated through the use of a novel method and means for confining the combustion process to a relatively short longitudinal zone which may, in practical embodiments of the invention, be as short, for example, as a quarter of an inch even when the relative velocity of the induced air flow is as high as several thousand feet per second.

The invention comprehends a novel aerothermodynamic duct wherein a mode of combustion distinct from that which is commonly used in heat engines of the prior art may be aerodynamically initiated and sustained independently of auxiliary ignition or flame holding structures. In the preferred practice of the invention, exothermic reaction of fuel-air mixture is sustained according to a reactive process of the type generally referred to as detonation; that is, a process wherein a flame front is sustained primarily by an abrupt temperature rise occurring across a relatively short longitudinal distance in a compressive wave, rather than by the usual mode of combustion employed in aerothermodynamic ducts as well as other internal combustion engines of the prior art. Whereas detonation as normally considered in connection with an internal combustion process, however, is a spacially mobile and temporally transient phenomenon of extremely short duration, in the present invention a stable, continuous detonation is established and maintained across a standing wave of fixed position relative to a confining structure therefor, subsequent expansion of the gaseous detonation product being used to develop a continuous thrust.

It is one object of the invention to provide an aerothermodynamic duct wherein propulsive thrust is developed by continuous detonation of a fuel-air mixture.

It is another object of the invention to provide an aerothermodynamic duct for operation in a hypersonic air stream wherein continuous detonation of a fuel-air mixture takes place in consequence of the rise in static temperature across a wave of substantially fixed position relative to said duct.

It is another object of the invention to provide an aerothermodynamic duct for operation in a hypersonic air stream wherein continuous detonation of a fuel-air mixture takes place in consequence of the temperature rise across a standing wave lying in a plane substantially normal to the direction of said airstream.

It is another object of the invention to provide an aerothermodynamic duct wherein continuous detonation of a fuel-air mixture may be established and sustained by means of a system of interrelated waves that may be partially external to the confining walls of the duct.

It is another object of the invention to provide a combination including a vehicle and a propulsive aerothermodynamic duct therefor wherein at least part of a compressive process leading to sustained detonation in said duct may be excited externally thereof by said vehicle.

It is another object of the inveniton to provide an aerothermodynamic duct wherein detonation of a fuel-air mixture is initiated and sustained by aerodynamic means.

It is another object of the invention to provide means for maintaining a standing wave detonation zone at a desired position in an aerothermodynamic duct wherein the aerodynamic condition at the inlet thereof may undergo variation from a desired condition.

It is another object of the invention to provide an aerothermodynamic duct wherein fuel may be introduced into the air stream substantially upstream of the region wherein combustion is sustained.

It is another object of the invention to provide an aerothermodynamic duct wherein the distribution of combustion temperature may be confined to a relatively short longitudinal zone thereof.

It is another object of the invention to provide an aerothermodynamic duct that may be used for propulsion of manned as well as unmanned vehicles intended for either ballistic or aerodynamically sustained flight in an atmosphere which includes at least one component of a chemical combination for detonative combustion in said duct.

It is another object of the invention to provide an aerothermodynamic duct for continuous detonation of a fuel-air mixture, wherein said fuel is hydrogen.

These and other objects of the invention will be more clearly understood from the following particular description thereof, reference being had to the appended drawings.

In the drawings, which are merely illustrative and not to be construed by way of limitation, and in which like elements are denoted by like reference numerals:

FIG. 1 is an elevation, partially broken away, of an aircraft incorporating a propulsive engine according to the present invention;

FIG. 2 is a bottom plan view of the aircraft shown in FIG. 1;

FIG. 3 is a horizontal section on an enlarged scale taken along the line 3 — 3 of FIG. 1 showing certain internal features of the propulsive engine;

FIG. 4 is a vertical section on the same scale as FIG. 3 and taken along the line 4 — 4 of FIG. 2;

FIG. 5 is a vertical section of an alternate arrangement for a propulsive engine embodying the invention;

FIG. 6 is a cross section on an enlarged scale taken along the line 6 — 6 of FIG. 5;

Figure 7:
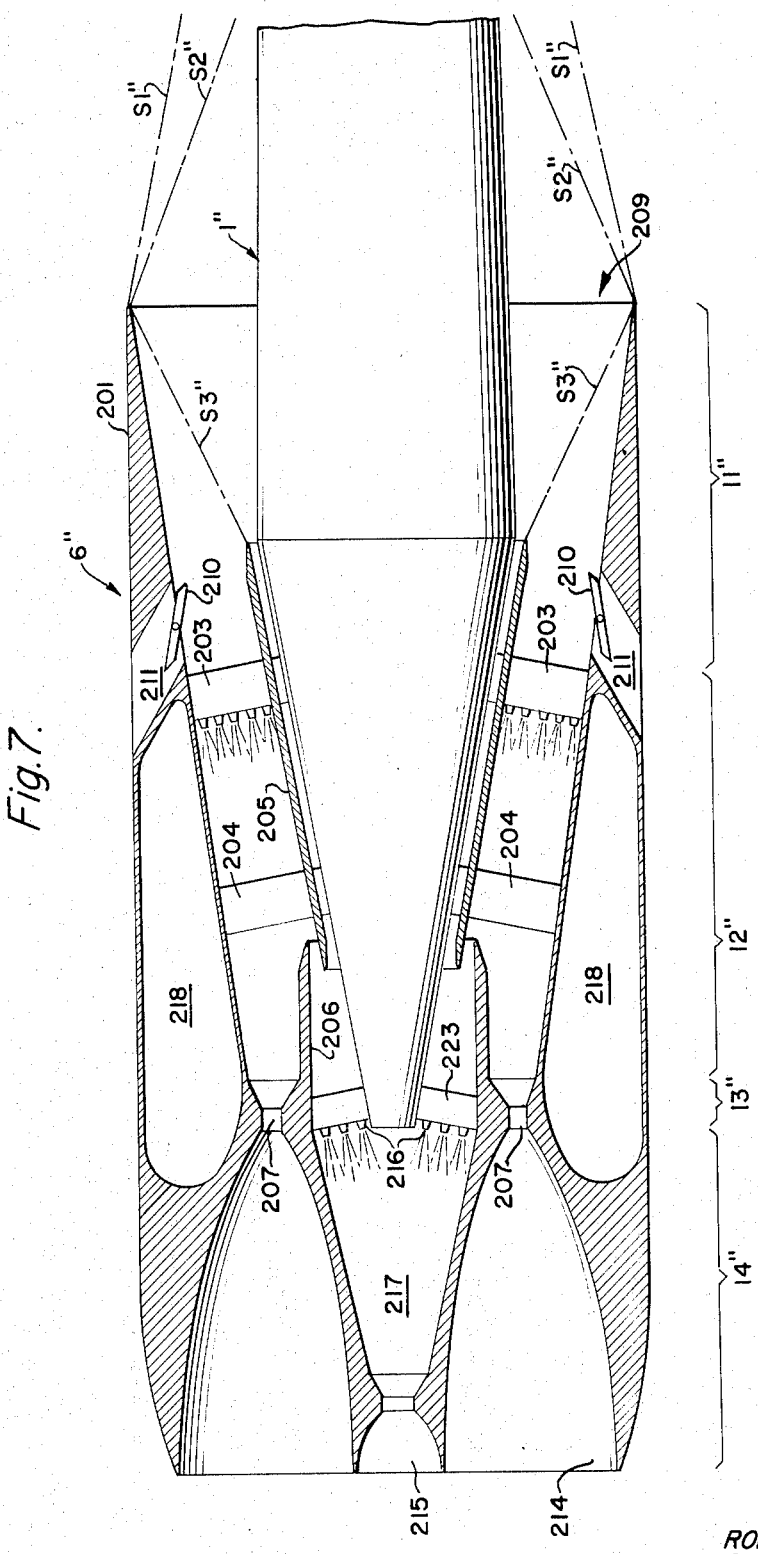
FIG. 7 is a vertical section of a second alternate arrangement for a propulsive duct embodying the invention.

Referring to FIGS. 1 and 2, an aircraft 1 of a type adapted for flight at so-called hypersonic Mach numbers, for example, in the region of $M = 6.5$ is shown having an acutely tapered nose portion 2, an aerodynamic sustaining surface or wing 3 having sharply swept leading edges 4, and a body or fuselage 5, the lower portion of the latter housing a propulsive engine 6 according to the present invention, it being understood, however, that the structural and aerodynamic features of the aircraft 1 form part of the invention only insofar as they are adapted to co-operate with engine 6 in a manner to be particularly described hereinafter.

As is more clearly shown in FIGS. 3 and 4, the engine 6 comprises an elongated duct having an intake portion 11, an intermediate or diffuser portion 12 adapted to excite and contain a system of shock waves in a manner to be particularly described hereinafter, a combustion portion 13 and an exhaust nozzle 14. Associated with the engine 6 but not comprising an essential element thereof may be a second engine 16, which may, for example, be a turbo-jet of known type.

As previously discussed, the propulsive engine 6, which is an aerothermodynamic duct, depends for its operation on the continuous detonation of a fuel-air mixture due to the temperature rise across a standing wave, which may, for example, be a normal wave as indicated by dashed line S6, it being understood, however, that in alternate embodiments of the invention detonation might also be excited across an oblique wave. The manner in which the wave S6 is originated and maintained will now be described, reference being had to exemplary aerodynamic conditions at an altitude of 125,000 feet and a free stream Mach number of 6.5, it being understood that where operation under a different set of conditions is desired the geometry of the combined aircraft and engine 6 may be appropriately proportioned in accordance with aerodynamic principles well known to those skilled in the art.

Referring to FIG. 1, the dashed line S1 indicates an oblique shock wave originating at the nose 2 and extending rearwardly therefrom, at an angle determined by the free stream Mach number, to intersect the leading edge 23 of a forwardly raked induction scoop 22 which defines the entrance to inlet portion 11 of the propulsive engine 6. As is well known to those skilled in the art, the Mach number characterizing the flow in the region designated by the numeral 20 behind the shock wave S1 will be somewhat lower than the previously stated free stream value of $M = 6.5$ which may be considered to apply in the region 10 immediately forward thereof, this decrease in Mach number being accompanied by a rise in both static pressure and static temperature. For convenience of reference throughout the following discussion, the values of pressure, temperature, Mach number and velocity prevailing in the various flow regions shown in the drawing are tabulated below:

TABLE I

| Region | Total Pressure (PSIA) | Static Pressure (PSIA) | Static Temp. (°R) | Mach No. (M) | Velocity (FPS) |
|---|---|---|---|---|---|
| 10 | 191.2 | 0.0541 | 460 | 6.50 | 6820 |
| 20 | 187.4 | 0.0943 | 542 | 5.88 | 6710 |
| 30 | 186.8 | 0.1444 | 614 | 5.52 | 6670 |
| 40 | 155.8 | 0.6250 | 975 | 4.18 | 6330 |
| 50 | 150.7 | 1.3263 | 1208 | 3.64 | 6120 |
| 60 | 147.5 | 2.5069 | 1437 | 3.24 | 5890 |
| 70 | 132.6 | 7.3470 | 1820 | 2.50 | 5250 |
| 80 | 54.4 | 36.8 | 4950 | 0.801 | 2660 |
| 90 | 53.4 | 0.0677 | 1170 | 5.0 | 8335 |

To take advantage of the reduced Mach number prevailing in the region 20, the aircraft fuselage 5 is provided with a ramp 25 having a sharp leading edge disposed transversely of the relative flow to generate a second oblique shock wave S2 which extends rearwardly to intersect the shock wave S1 at the leading edge 23 of induction scoop 22, the ramp 25 preferably being provided with boundary layer diversion slots 27 of known type to minimize the deflection of turbulent flow into the region 30 behind shock wave S2. Referring to Table I it will be seen that the Mach number characterizing the flow in region 30 has been still further reduced from the free stream value, and that the static pressure and static temperature have been correspondingly increased.

In consequence of the further deflection of the air flow by leading edge 23, a third oblique shock wave S3 extends rearwardly therefrom into intake portion 11, the pressure, temperature and Mach number prevailing in region 40 behind shock wave S3 being further changed as indicated in Table I. As shown in FIG. 4, shock wave S3 intersects the entrance to intermediate duct portion 12 adjacent the leading edge 29 of a second boundary layer diversion structure comprising paired wall members 31 and 32, 33 and 34, and 35 and 36 defining diversionary passages 37, 38 and 39, respectively, the last named preferably being of bifurcate construction to communicate with passages 37 and 38, as through symmetrically disposed transition passages 41. Intermediate duct portion or diffuser 12 extends rearwardly with substantially constant vertical dimension but is tapered in the horizontal plane as shown in FIG. 3, thereby to sustain a symmetrically disposed pair of oblique shock waves S4 excited by the leading edges of wall members 32 and 33. The shock waves S4 define laterally opposed flow regions 50 and intersect with each other in mutually reinforcing manner to define a subsequent flow region 60 which extends into combustion portion 13 and is characterized by temperatures, pressures and Mach number as shown in Table I. In combustion portion 13 the cross sectional area and wall contour of the duct undergo an abrupt change at the leading edge of hinged ramp 15, the aerodynamic consequence of this change being to excite an oblique shock wave S5 which extends rearwardly from the leading edge of ramp 15 to intersect with wall member 43, the pressure, temperature and Mach number which characterize the flow in region 70 behind shock wave S5 being as indicated in Table I. Hingedly mounted ramp 15 cooperates with fixed wedges 46 to define a throat wherein a normal wave S6 may be sustained, the ramp 15 being angularly adjustable as by external control actuator 44 to vary the area of said throat in accordance with changes in the condition of relative flow therethrough, thereby to maintain the wave S6 is substantially fixed position. In a preferred practice of the invention, the space between ramp 15 and boundary layer diversion wall 45 may be enclosed by hinged seal 49 extending transversely thereof, the enclosed space being vented to the static pressure in region 60 to reduce the operating force required of the actuator 44.

In order to initiate the continuous detonation whereby propulsive thrust may be developed, the normal wave S6 may be established remotely of wedges 46 and aerodynamically transferred to the desired position therebetween, as will now be described. Referring once more to intake portion 11, induction scoop 22 may be provided with a suitably shaped detachable closure or fairing, such fairing being jettisonable by explosive or other well known means when the altitude and flight speed at which it is desired to operate the engine 6 have been attained. It is to be understood, however, that the fairing does not constitute an indispensable element of the present invention, but rather that it is merely a structural and aerodynamic expedient effective to reduce drag during acceleration of the aircraft 1 to the speed at which the propulsive engine 6 is to be used. Upon removal of the fairing, a normal shock wave will be formed in the entrance to induction scoop 22, the flow downstream of such wave being subsonic and hence not suited for the formation of the interrelated system of oblique shock waves S3, S4 and S5 as hereinbefore described. In order to transfer the normal shock wave to the desired position between wedges 46, bottom wall 24 of intake portion 11 is provided with a hinged door 26 normally lying flush therewith, but angularly displaceable as by control actuator 28 for projection into the induced air flow as indicated by broken lines 26a. With the door 26 in the angularly displaced position 26a, a portion of the induced air flow is diverted through the aperture thus formed in the wall 24, and the normal shock wave is advanced to the position indicated by dashed line S6a. With the wave S6a confined by the convergent walls of intake portion 11, door 26 may be restored to its original position flush with the wall 24, the consequent pressure rise in the intake portion 11 being effective to drive the wave toward combustion portion 13 where it becomes lodged in the constricted throat formed by hinged ramp 15 and wedges 46 as hereinbefore described.

Referring to Table I, it will be seen that in the desired operating condition wherein the several discrete flow regions 20 through 70 have been established and stabilized, a stepwise increase in static temperature accompanies each successive shock wave excited by the aircraft and duct combination. To take advantage of this temperature increase in the manner comprehended by the present invention, a fuel having a detonation temperature below the static temperature occurring in the wave S6 must be selected, an exemplary fuel conforming to this requirement for the thermodynamic conditions characterizing the present embodiment of the invention being hydrogen, $H_2$. Though the static temperature occurring in flow region 70 downstream of oblique shock wave S5 may exceed the ignition temperature of a hydrogen-air mixture, the time required for the fluent mixture to traverse this region at the prevailing flow velocity is so short in comparison with the timed needed to achieve non-detonative combustion that the mixture may remain relatively unaffected chemically until it reaches the wave S6. The static temperature rises abruptly in the wave S6 to a value approximately equal to the preceding value of total temperature (i.e., 3,650°R), and the resulting detonative exothermic reaction of the mixture further increases the static temperature to approximately 4,950°R as shown in Table I. If the flow condition approaching the combustion portion 13 tends to deviate from that for which the dimensions of the duct and its associated shock wave exciting structures are specifically adapted, pre-ignition may occur in the region 70, and in such event the angular displacement of hinged ramp 15 may be reduced, thereby to increase the Mach number and decrease the static temperature prevailing in the region 70, and thus to restore the combustion process to the region of the wave S6 wherein the desired detonative mode of combustion may be sustained.

Whereas the term "shock wave" is generally understood in the vocabulary of aero- and thermodynamics to denote an adiabatic compression wave, it will be apparent from the foregoing description that the flow process which takes place in the region of the wave S6 ceases to be adiabatic when heat is added thereto by detonation of the fuel and air mixture in consequence of the static temperature rise occurring across the wave. Thus, when detonation has been initiated by injection of combustible fuel into the induced air flow, the aero- and thermo-dynamic processes which separate the flow regions 70 and 80 no longer strictly conform to the generally accepted definition of the term "shock wave." In order to avoid such confusion or misunderstanding as might arise from the use of the term "shock wave" in this context, therefore, the phenomena which mark the transition between flow regions 70 and 80 will be hereinafter referred to as a "combustion wave," it being understood that such designation is intended to include the aerodynamic processes due to compressibility effects as well as chemical and thermodynamic processes due to detonation of the fuel and air mixture, and to distinguish such wave from the truly adiabatic shock waves S-1, S-2, S-3, S-4, and S-5 hereinbefore described.

As the values of static temperature upstream of flow region 70 during the steady state operation of the engine nowhere exceed the ignition temperature of a hydrogen-air mixture, fuel may be introduced into the airflow at any desired point forward of combustion portion 13, thereby to take advantage of mixing afforded by the network of oblique shock waves hereinbefore described. Accordingly, in the preferred practice of the invention, fuel is injected via nozzles provided in the trailing edges of vertically aligned struts 17 spaced transversely of intermediate portion 12 and in the inlet region thereof as shown. As will be apparent to those skilled in the art, however, numerous other arrangements for fuel injection may be provided, the operating principles and aerodynamic flow patterns characteristic of the invention making it feasible even to inject fuel upstream of the induction scoop 22 if so desired.

Diversion passages 27, 37, 38, 39, 51, 52, 53 and 54, prevent the formation of unduly thick boundary layers adjacent the duct walls, thereby tending to augment the aerodynamic efficiency of the engine and to reduce the quantity of heat transferred to the structure thereof. In addition, these passages mitigate undesirable interaction between the relatively slowly moving boundary layer and the hereinbefore described pattern of waves. By diverting the boundary layer air away from the interrelated system of shock waves S1, S2, S3, S4, S5, and the combustion wave S6, the diversion passages tend to increase the aerodynamically effective cross-sectional area of the duct and to prevent the accumulation therein of a large mass of relatively stagnant air at the high static temperature corresponding to the Mach number of the adjoining supersonic flow. If desired, fuel may be admixed with the air induced by passages 37, 38, 39, 51 and 52, as through auxiliary injectors 47, and burned in nozzles 48 for discharge with the gaseous detonation product of combustion wave S6 via exhaust nozzle 14.

Though the vehicle shown may be accelerated to the desired operating Mach number by auxiliary means, such as a jettisonable booster as hereinbefore stated, it will be apparent that landing cannot be safely accomplished at a velocity corresponding to the high Mach number required for use of the engine 6 according to the described operating cycle thereof. For landing, therefore, the vehicle 1 is additionally provided with second engine 16, which may preferably be a turbojet of well known type suitable for operation at subsonic Mach numbers. In order to avoid unnecessary increase to the frontal area of the vehicle 1 or disturbance of the air flow adjacent thereto, such as might result from the provision of separate intake and exhaust openings for engine 16, advantage is taken of the intake duct and exhaust nozzle of engine 6, the corresponding portions of engine 16 being connectable in flow communication therewith by passages 55 and 56 which are provided with doors 57 and 58, respectively, hingedly operable as by external control actuator 65 and linkage 66 to open positions 57a and 58a. Thus when it is desired to land, the vehicle 1 may be slowed by aerodynamic drag to an appropriate speed, the propulsive detonation in engine 6 having first been suspended by interruption of the fuel supply thereto, and doors 57 and 58 may be opened to place the engine 16 in flow communication between intermediate duct portion 12 and exhaust nozzle 14, thereby rendering engine 16 operable for the development of propulsive thrust sufficient to sustain maneuverability and control of the vehicle 1 until landing has been completed.

In the aircraft and engine combination shown in FIGS. 1 through 4 the nozzle 14 is asymmetrically shaped to receive the exhaust flow from engines 6 and 16 as well as to provide for the accommodation of both engines in an envelope of aerodynamically favorable shape and cross-sectional area. Thus, while the asymmetric shape of the nozzle 14 does not afford the best possible kinetic efficiency in the exhaust flow from either of the two engines, the small loss of efficiency attributable thereto may be more than counterbalanced by the reduction in aerodynamic drag due to the improved shape and cross-sectional area of the vehicle 1. Where it is not required to land the vehicle under the control of an internal power source, moreover, an alternate arrangement of the engine and vehicle combination may be employed, such an arrangement being designed to carry out the described method of detonative combustion in a propulsive apparatus appropriately integrated with the particular type of vehicle with which it is to be used. Exemplary embodiments of three such alternate arrangements are illustrated in FIGS. 5 through 10.

Referring to FIG. 5, an aerothermodynamic duct of annular configuration, such as might be used for one propulsive stage of a multi-stage vehicle, is shown in vertical section. As in the previously described embodiment of the invention, the engine 6' of FIG. 5 comprises a duct having an inlet portion 11', an intermediate portion 12', a combustion portion 13', and an exhaust nozzle 14', all of said portions being aligned axially of a substantially conical fuselage 1', the structure defining the respective portions of the duct being disposed annularly thereof. A cylindrical outer mantle or cowl 101 is supported in spaced relation to fuselage 1' as by radial struts 102, 103, 104, the leading edge of cowl 101 defining an annular intake opening 109 and being positioned to intersect a first conical shock wave S1' excited by the nose portion (not shown) of fuselage 1', and a second conical shock wave S2' excited by the leading edge of annular boundary layer diversion structure 105. A third conical shock wave S3' excited by the leading edge of cowl 101 extends rearwardly therefrom to enter intermediate portion 12' adjacent the leading edge of a second boundary layer diversion structure 106.

Annular wedges incorporated in cowl 101 and boundary layer diversion structure 106 define a throat 107 in combustion portion 13' wherein the desired normal shock wave may be retained. In order to convert the normal shock wave lodged in the throat 107 to a combustion wave as hereinbefore described fuel is admixed with the induced air flow via injection nozzles 108 incorporated in struts 103, consequent detonation of the fuel and air mixture being excited by the static temperature rise aerodynamically induced across the wave. The gaseous detonation product expelled from combustion portion 13' is expanded via exhaust nozzle 14' which may, for example, be a so-called plug nozzle of well known type as shown, the resulting pressure difference axially of the engine and fuselage combination being effective to impart the desired propulsive thrust thereto.

In order to establish a normal shock wave at the desired position in throat 107 a plurality of hinged doors 110 is disposed radially of cowl 101 in the region of intermediate portion 12', the function and operating cycle of such doors being substantially as hereinbefore described with reference to the door 26 in the embodiment of FIGS. 1 through 4. Thus, when the vehicle has been accelerated to the desired speed, as by a detachable booster, hinged doors 110 may be momentarily opened to permit the normal wave formed adjacent the leading edge of cowl 101 to move downstream thereof to a new position adjacent the inwardly projecting leading edges of the doors 110. Subsequent closure of the doors 110 will cause the wave to be driven further downstream and ultimately lodge in the throat 107. As previously described, detonation may be established by injection of fuel into the induced air flow after the normal shock wave has been stabilized at the desired position.

Air induced by boundary layer diversion passages 112, 113 is expelled rearwardly through nozzle 115. If so desired, fuel may be admixed with boundary layer air prior to expulsion thereof, as by auxiliary injectors 116 in mixing chamber 117, a secondary thrust vector being derived by combustion and expansion of the resulting mixture in nozzle 115.

The interior of fuselage 1' houses fuel tank 118, control apparatus as indicated at 119 and a desired cargo or payload as indicated at 120, the fuel tankage 118 preferably being thermally insulated from the envelope 121 of vehicle 1' by suitable packing 122.

FIG. 7 illustrates a second alternate arrangement whereby a propulsive duct embodying the invention may be disposed annularly to a central body or fuselage. In the drawing, wherein an engine 6" and a portion of the fuselage 1" of a vehicle associated therewith are shown in vertical section, bracketed regions 11", 12", 13" and 14", designate intake, intermediate, combustion and exhaust portions, respectively, of a propulsive aerothermodynamic duct according to the invention. The outer wall of the duct is provided by a substantially cylindrical mantle or cowl 201 supported in spaced relation to the central fuselage 1" by a plurality of angularly spaced struts 203 and 204, the opposing surfaces of the fuselage 1" and the cowl 201 cooperating to define an annular duct of substantially conical shape tapering from an inlet 209 to a throat 207, the latter communicating with an annular expansion nozzle 214 of well known internal profile. Boundary layer diversion passages are provided by the wall member 205 supported in spaced relation to the fuselage 1" by struts 203 and 204, and by the member 206 which additionally defines one wall of combustion and exhaust portions 13" and 14" and of a mixing chamber 217 wherein fuel may be introduced to the diverted boundary layer air, as by nozzles 216 incorporated in struts 223, for admixture therewith and subsequent combustion in boundary layer exhaust nozzle 215 to produce a secondary thrust vector. The space provided between the cylindrical outer surface and conical inner surface of the cowl 201 may be utilized to advantage for the provision of annular fuel tank 218, additional space for the accommodation of tankage and control mechanism being available internally of the fuselage 1".

The cowl 201 is provided with a plurality of angularly spaced doors 210 hingedly operable to direct a portion of the induced air flow through the diversionary passages 211, thereby to permit a normal shock wave to be induced into the duct and transferred to the throat 207 thereof as described above. In the stable operating condition of the engine 6", successive increases in static temperature and pressure take place across the oblique shock waves S1" and S2" which are excited by structural features (not shown) of the forwardly extending portion of fuselage 1", and the oblique shock wave S3" which is excited by the leading edge of cowl 201 and is propagated rearwardly therefrom into intake portion 11". In the intermediate portion 12", fuel introduced via injection nozzles 208 incorporated in struts 203 is mixed with the fluent air stream for subsequent detonation due to the temperature rise across the wave lodged in the throat 207. The gaseous combustion product expelled from the throat 207 is expanded in the exhaust nozzle 214 for development of propulsive thrust axially thereof, such thrust being transmitted to the fuselage 1" by struts 203, 204 and 223.

Figure 8:
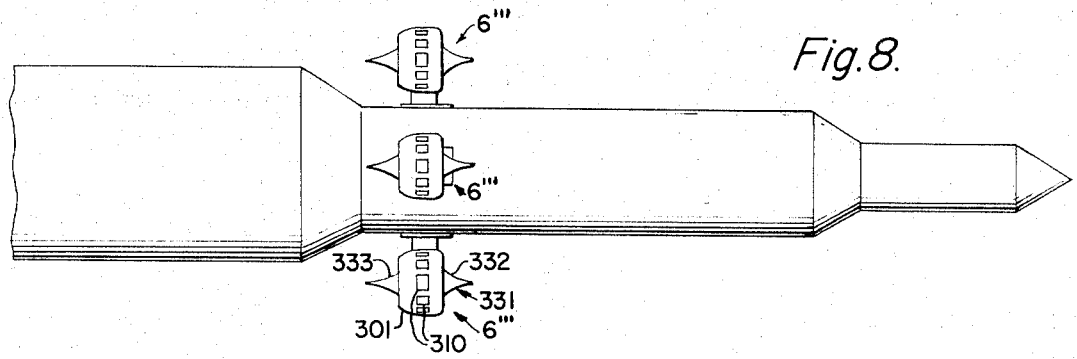
FIG. 8 is an elevation showing the forward portion of a vehicle having multiple stages of propulsion, one stage thereof being provided by a plurality of externally mounted engines according to a modified form of the invention.

FIG. 8 shows a multiple stage vehicle for ballistic flight, one stage of said vehicle being provided with externally mounted engines 6''' according to a modified practice of the invention wherein an initial portion of the compression leading to the establishment of a standing wave detonation is accomplished continuously rather than through stepwise increments as in the previously described embodiments.

Figure 9:
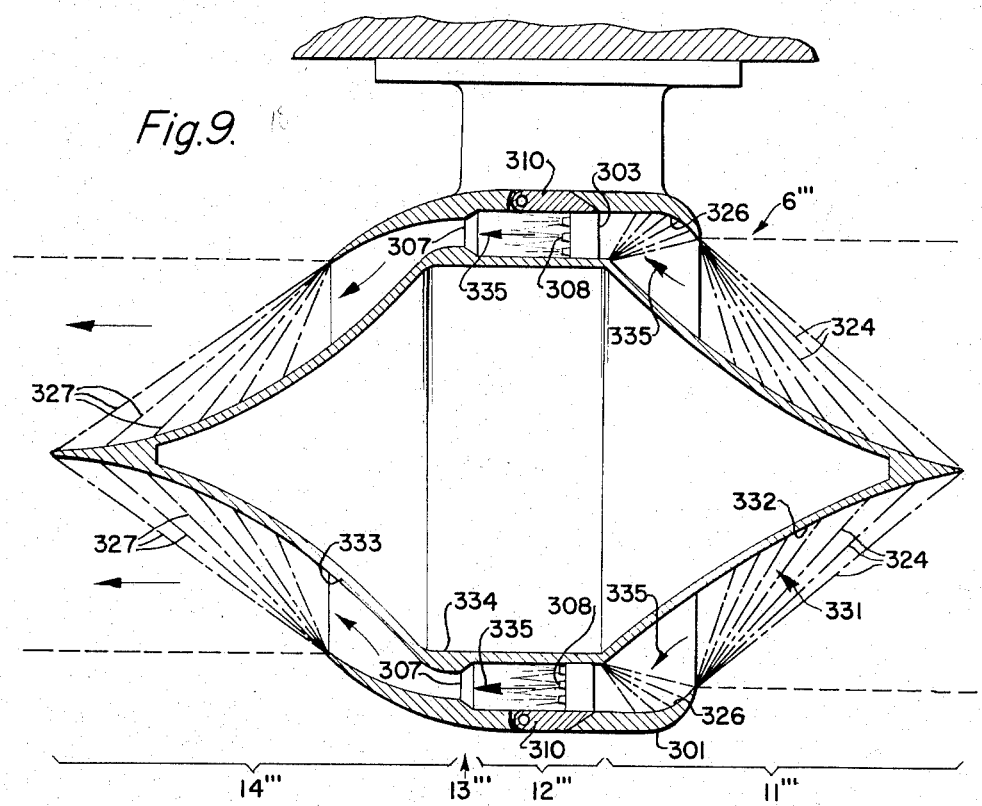
FIG. 9 is a vertical section on an enlarged scale of the engine shown in FIG. 8.

Referring to FIG. 9, an engine according to the embodiment of FIG. 8 is shown in vertical section on an enlarged scale, the intake, intermediate, combustion and exhaust portions thereof being designated by bracketed regions 11''', 12''', 13''' and 14''' respectively. As shown in the drawing, the engine includes an annular cowl 301 supported in spaced relation to a central body 331 by a plurality of angularly spaced struts 303, the cowl 301 and central body 331 cooperatively defining an annular duct wherein the direction of relative air flow is an indicated by the arrows 335. The duct includes a constricted throat 307 for the formation of a combustion wave or standing wave detonation therein, annular cowl 301 being provided with a plurality of doors 310 disposed peripherally thereof and upstream of the throat 307, such doors being hingedly operable for diversion of the induced air flow to permit establishment of the desired normal shock wave in throat 307 as hereinbefore described.

The central body 331 includes a front fairing 332 for isentropic compression of the induced air flow, a rear fairing 333 for isentropic expansion of the expelled combustion product, and an intermediate spacer 334 cooperative with the cowl 301 to define the intermediate portion 12''' of the duct. The front fairing 332 provides a surface whereby the air flow may be progressively deflected to excite a continuous series of weak shock waves or so-called Mach lines 324 therein, the profile of said surface preferably being such as to cause the Mach lines 324 to converge, at a desired free stream Mach number, at the leading edge of the shroud 301 as shown. As is well known to those skilled in the art, an isentropic pressure change occurs across the weak shock wave or Mach line excited when a supersonic flow is minutely deflected, as by a small change in the contour of a surface defining a boundary thereof, a continuous series of such small changes which defines a curved surface being effective to excite a correspondingly continuous series of Mach lines across which a cumulative pressure change occurs. Such surfaces, which are generally referred to as isentropic compression or expansion surfaces according to the sense of the pressure change produced thereby, may be designed for specific flow conditions and desired pressure gradients according to principles well known to those skilled in the art, an exemplary discussion of such principles being set forth at pages 651 to 699, inclusive, of Volume II of Dynamics and Thermodynamics of Compressible Fluid Flow by A. A. Shapiro, The Ronald Press Company, N. Y., 1953, hereby incorporated in this specification by reference. In the instant embodiment of the invention, the front fairing 332 and the forward lip 326 of shroud 301 are isentropic compression surfaces whereby the static pressure of the induced air flow may be raised to the desired pressure for admission to intermediate duct portion 12'''.

In the intermediate portion 12''', fuel discharged by injection nozzle 308 incorporated in angularly spaced struts 303 is diffused throughout the induced air stream, the resulting fuel-air mixture being detonated in combustion portion 13''' in consequence of the rise in static temperature which occurs across the standing wave lodged in the throat 307. The gaseous detonation product expelled from the throat 307 is expanded via a plug nozzle comprising the rear portion of shroud 301 and the rear fairing 333, the latter being an isentropic expansion surface whereby a thrust producing pressure difference axially of the engine 6''' may be developed. A so-called expansion fan, indicated by lines 327, represents the approximate locus of isentropic expansion occurring in the exhaust portion 14'''.

It will be apparent that the embodiment shown in FIGS. 8 an 9 achieves certain advantages over those previously described, a specific instance thereof being the reduction in axial dimension made possible by the continuous, rather than stepwise, manner in which the induced air flow is compressed. In the instant embodiment, moreover, as the provision of structure extending forwardly of the engine and precisely disposed in relation to the intake thereof to excite a desired pattern of shock waves has been obviated, it is possible to adapt the engine not only for use with ballistic vehicles of the type shown in FIG. 8, but also for use with aerodynamically sustained vehicles wherein the provision of one or more engines of the present type may be desirable for augmentation of performance under certain desired conditions of speed or altitude.

The foregoing discussion of the preferred practice of the invention as exemplified by the embodiments thereof illustrated in the appended drawings has been directed primarily to the structural and geometric features characterizing exemplary aerothermodynamic ducts wherein the detonative reaction propulsion method of the invention may be effectively carried out, various control elements important to but not forming an essential part of the invention having been omitted from the present description and drawings for the sake of clarity. Certain of these elements, as, for example, control actuators and linkages necessary for the operation of hingedly or otherwise movably mounted members, may of course be provided by any of a number of means sufficiently well known in the art to require no further description or illustration herein, the adaptation of such means to particular kinematic requirements being generally a matter of ordinary rather than inventive skill in the specific arts pertaining thereto. Other elements not herein particularly described but relating to operational and structural features associated with certain practices of the invention are disclosed in the copending application of Leslie W. Norman, Skillman P. Hunter and George A. Russell entitled Control Method for Detonation Combustion Engine, filed Mar. 2, 1961, and identified by Ser. No. 92,827, and the copending application of Archibald P. Kelley, Leslie W. Norman and Skillman C. Hunter entitled Fuel Injection System for Aircraft, filed Mar. 30, 1961, and indentified by Ser. No. 99,431.

It will be apparent that while the propulsion method and apparatus for the present invention have been herein disclosed with specific reference to certain preferred embodiments thereof for operation at a specific Mach number and altitude, with a specific fuel, and with air as an oxidant, the utility of the invention is by no means limited thereto but is adaptable according to well known principles of aero- and thermodynamics to use in conjunction with a variety of cooperative vehicles, under a variety of flight conditions, with a variety of known fuels, and even in ambient atmospheres of different chemical composition than the terrestrial one herein considered, it being understood that the desired dimensional relations between particular structural elements leading to the establishment and maintenance of a propulsive standing wave detonation or combustion wave in a particular aerothermodynamic duct embodying the invention may be computed according to methods which are well known to those skilled in the arts pertaining to super-and hyper-sonic aerodynamics and amply documented in the literature thereof. It is anticipated that those skilled in the art will have occasion to practice numerous variations on specific features of the propulsive method and apparatus herein disclosed, and it is our desire that all such variations falling within the spirit and scope of the invention be secured to us by Letters Patent.

We claim:

1. An aerothermodynamic duct for operation at a free stream Mach number greater than unity which comprises: an inlet portion for inducing air into said duct, said inlet portion including door means separating the interior of said duct from the exterior thereof, said door means being hingedly operable from a closed position to an open position to permit a normal shock wave to enter said duct, and from said open position to said closed position to permit said wave to be driven downstream of said inlet; a combustion portion downstream of said inlet portion, said combustion portion including an adjustably constricted throat for receiving and retaining said wave; injection means intermediate said inlet portion and said combustion portion for mixing fuel with said induced air for detonation in the region of said wave in consequence of the static temperature rise thereacross; and an expansion nozzle downstream of said throat for expelling the product of said detonation rearwardly of said duct to impart propulsive thrust thereto.

2. An aerothermodynamic duct as set forth in claim 1, in which said duct has a substantially rectangular cross section.

3. An aerothermodynamic duct as set forth in claim 1, in which said duct has a substantially circular cross section.

4. An aerothermodynamic duct for operation at a free stream Mach number greater than unity which comprises: an inlet for inducing air into said duct, said inlet portion including door means spaced from the inlet end of said duct and separating the interior of said duct from the exterior thereof, said door means being hingedly operable from a closed position to an open position to permit a normal shock wave to enter said duct, and from said open position to said closed position to permit said wave to be driven downstream of said inlet portion; a combustion portion in flow communication with said inlet portion and downstream thereof, said combustion portion including a constricted throat for receiving and retaining said wave; injection means intermediate said inlet portion and said combustion portion for mixing fuel with said induced air, said fuel being capable of exothermic reaction with said air for detonation in consequence of the static temperature rise across said wave; a movable ramp cooperative with said throat to vary the area thereof for retaining said wave in substantially fixed position under varying conditions of flow in said combustion portion; and an expansion nozzle downstream of said throat for expelling the product of said detonation rearwardly of said duct to impart propulsive thrust thereto.

5. An aerothermodynamic duct as set forth in claim 4, in which said duct has a substantially rectangular cross section.

6. An aerothermodynamic duct as set forth in claim 4, in which said duct has a substantially circular cross section.

7. An aerothermodynamic duct for operation at a Mach number greater than unity which comprises: a substantially cylindrical body member; an annular cowl supported in spaced relation to said body member and defining an annular duct circumjacent thereto, said duct having a forwardly facing intake opening and a rearwardly facing exhaust opening; door means disposed circumferentially of said cowl downstream of said inlet opening, said door means being hingedly operable from a closed position to an open position to permit a normal shock wave to enter said duct, and from said open position to said closed position to cause said wave to be driven downstream of said inlet; constrictive means defining a throat annularly of said duct downstream of said door means for receiving and retaining said shock wave; injection means disposed annularly of said duct upstream of said throat for mixing fuel with said induced air, said fuel being capable of exothermic reaction with said air in consequence of the static temperature rise across said wave, thereby to sustain a relatively stationary combustion wave in said throat; and an expansion nozzle connecting said throat with said exhaust opening for expulsion of the product of said combustion wave rearwardly of said duct to impart propulsive thrust thereto.

8. An aerothermodynamic duct for operation at a free stream Mach number greater than unity which comprises: a cylindrical body member having front and rear fairings, said front fairing being a surface of revolution for isentropic compression of a relatively removing gaseous flow whereof the Mach number is greater than unity, and said rear fairing being a surface of revolution for isentropic expansion of a relatively moving gaseous flow whereof the Mach number is greater than unity; an annular cowl supported in spaced relation to said body member and defining an annular duct circumjacent thereto, said duct having a forwardly facing intake opening for cooperation with said front fairing and a rearwardly facing exhaust opening for cooperation with said rear fairing; door means disposed circumferentially of said cowl downstream of said inlet opening, said door means being hingedly operable from a closed position to an open position to permit a normal shock wave to enter said duct, and from said open position to said closed position to cause said wave to be driven downstream of said inlet; constrictive means defining a throat annularly of said duct intermediate said door means and said exhaust opening for receiving and retaining said wave; and injection means disposed annularly of said duct upstream of said throat for mixing fuel with said gaseous flow, said fuel being capable of exothermic reaction with said gas in consequence of the static temperature rise across said wave, thereby to sustain a relatively stationary combustion wave in said throat.

9. A method of operating an aerothermodynamic duct which comprises the steps of: moving the duct through the air at a Mach number high enough to create a normal shock wave at the inlet end of the duct; bleeding air from the duct at a point spaced longitudinally from the inlet to cause the shock wave to enter the duct; interrupting the air bleeding step to cause the shock wave to move downstream of the duct beyond the point where the air was bled therefrom to a predetermined location; supplying fuel to the duct for mixture with the air and subsequent detonation upon passage through said normal shock wave; and expanding the heated products of the detonation in the downstream end of said duct to impart forward movement to the duct.

10. A method of operating an aerothermodynamic duct which comprises the steps of: moving the duct through the air at a Mach number high enough to create a normal shock wave at the inlet end of the duct; bleeding air from the duct at a point spaced longitudinally from the inlet to cause the shock wave to enter the duct; interrupting the air bleeding step to cause the shock wave to move downstream of the duct beyond the point where the air was bled therefrom to a predetermined location; supplying fuel to the duct for mixture with the air and subsequent detonation upon passage through said normal shock wave; changing the geometry of the duct adjacent the location of the point of detonation only to adapt the duct to movement at different Mach numbers; and expanding the heated products of the detonated fuel-air mixture at the downstream end of the duct to impart forward movement to the duct.

11. A method of operating an aerothermodynamic duct which comprises the steps of: moving the duct through the air at a Mach number high enough to create a normal shock wave at the inlet end of the duct;

bleeding air from the duct at a plurality of points spaced longitudinally from the inlet end of the duct to cause the shock wave to enter the duct; interrupting the air bleeding step to cause the shock wave to move downstream of the duct beyond the points where the air was bled therefrom to a predetermined location; supplying fuel to the duct for mixture with the air and subsequent detonation upon passage through said normal shock wave; and discharging the heated products of the detonated fuel-air mixture against a portion of said duct for isentropic expansion to impart forward thrust to the duct.

* * * * *

UNITED STATES PATENT OFFICE
CERTIFICATE OF CORRECTION

Patent No. 3,777,488              Dated December 11, 1973

Inventor(s) Robert A. Gross, Skillman C. Hunter and Leslie W. Norman

It is certified that error appears in the above-identified patent and that said Letters Patent are hereby corrected as shown below:

Claim 8, lines 5 and 6, change "removing" to --moving--.

Signed and sealed this 21st day of May 1974.

(SEAL)
Attest:

EDWARD M. FLETCHER, JR.          C. MARSHALL DANN
Attesting Officer                Commissioner of Patents